United States Patent [19]

Mine et al.

[11] 4,138,367

[45] Feb. 6, 1979

[54] METHOD OF PRODUCING CATALYST FOR CONVERSION OF CARBON MONOXIDE AND HYDROCARBONS IN ENGINE EXHAUST GAS

[75] Inventors: Junichi Mine; Akio Iizuka, both of Yokohama; Tetsuhiko Yoneshige, Yokosuka; Hidefumi Ito, Yokohama, all of Japan

[73] Assignee: Nissan Motor Company, Limited, Yokohama, Japan

[21] Appl. No.: 809,714

[22] Filed: Jun. 24, 1977

[30] Foreign Application Priority Data

Jul. 1, 1976 [JP] Japan .................................. 51-77079

[51] Int. Cl.$^2$ ........................ B01J 21/04; B01J 23/40
[52] U.S. Cl. ............................ 252/466 PT; 423/213.5
[58] Field of Search ................ 252/466 PT; 423/213.5

[56] References Cited

U.S. PATENT DOCUMENTS

| | | | |
|---|---|---|---|
| 2,908,654 | 10/1959 | Heinemann et al. | 252/466 PT |
| 3,741,725 | 6/1973 | Graham | 432/213.5 |
| 4,051,073 | 9/1977 | Hegedus et al. | 252/466 PT |

Primary Examiner—W. J. Shine

[57] ABSTRACT

A catalyst, which consists essentially of a catalytic metal, or metals, of the platinum group distributed on a carrier of active alumina and exhibits high conversion ability for CO and HC and good durability but exhibits a relatively low activity on the oxidation of $SO_2$, is produced by impregnating the carrier with an aqueous solution containing, dissolved therein, a complex of a salt of EDTA and the catalytic metal and baking the impregnated carrier in a stream of steam at temperatures between 300 and 700° C.

7 Claims, 3 Drawing Figures

METHOD OF PRODUCING CATALYST FOR CONVERSION OF CARBON MONOXIDE AND HYDROCARBONS IN ENGINE EXHAUST GAS

BACKGROUND OF THE INVENTION

This invention relates to a method of producing a catalyst for the catalytic oxidation of carbon monoxide and hydrocarbons in exhaust gas of internal combustion engines, which catalyst is of the type comprising a platinum group metal distributed upon a carrier of active alumina.

In the art of preventing the air pollution caused by the exhaust gas of internal combustion engines, particularly, of automotive use, the removal of carbon monoxide (CO) and unburned hydrocarbons (HC) from the exhaust gas is in many cases accomplished by catalytic oxidation. A catalyst for this use is required to be effective over a wide range of reaction condition and have a good durability because the catalyst has to be maintained in the exhaust system of the engine for a considerably long period of time while the exhaust gas has considerably high temperatures and exhibits frequent and indeterminable fluctuations in its temperature, composition and flow rate according as the operating condition of the engine or automobile varies. To meet these requirements, the most widely used catalytic substance at present is the metals of platinum group, either singularly or in combinations. A practical catalyst is given by impregnating or distributing the catalytic metal(s) upon a support or carrier of ceramics material in a form having a large specific surface area. Typical examples of such a material are active alumina such as gamma alumina and cordierite with an alumina coating. In a usual method of producing this type of catalyst, the carrier is impregnated with a solution of a thermally decomposable compound of the catalytic metal such as chloroplatinic acid or palladium chloride and then the impregnated carrier is baked in air or hydrogen to cause pyrolysis of the impregnated compound.

Conventional catalysts of this type are not yet fully satisfactory either in the conversion ability for HC on in its durability or ability of long retaining the catalytic activity. As an additional problem, these catalysts exhibit catalytic activity also on the oxidation of sulfur dioxide $SO_2$ in the exhaust gas to sulfur trioxide (anhydrous sulfuric acid) $SO_3$: this oxidation reaction is an unwanted one. This activity is particularly notable on catalysts containing platinum or palladium which exhibits a high conversion ability for CO and HC.

Recently the emission of sulfur oxides, particularly $SO_3$, from internal combustion engines has become a matter of serious concern. The presence of sulfur oxides in the exhaust gas of course originates in the presence of sulfur matter in gasoline. Although current techniques for the production of gasoline include sulfur removal procedures, it is practically impossible to provide a strictly sulfur-free gasoline. Commercially available gasoline contains, on the average, no less than about 0.01–0.02 Wt% (on the basis of S) of sulfur matter, so that the combustion gas of gasoline inevitably contains $SO_2$.

Since the exhaust contains about 10% of water (steam), if $SO_2$ is converted into $SO_3$ by the action of an oxidation catalyst disposed in the exhaust system, there is a strong possibility that $SO_3$ reacts with steam, resulting in the emission of sulfuric acid mist into the atmosphere. Even when $SO_3$ is discharged into the atmosphere without undergoing such reaction in the exhaust system, the same reaction tends to occur upon rapid cooling of the moisture-containing exhaust gas at the outside of the exhaust outlet.

The above described process may be expressed as follows, wherein the sulfur matter contained in gasoline is simply represented by S.

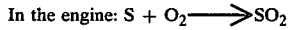
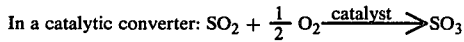
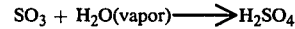

In the engine: $S + O_2 \longrightarrow SO_2$

In a catalytic converter: $SO_2 + \frac{1}{2} O_2 \xrightarrow{\text{catalyst}} SO_3$ In the exhaust line downstream of the converter:

$$SO_3 + H_2O(\text{vapor}) \longrightarrow H_2SO_4$$

There is a demand, therefore, for a catalyst which exhibits high catalytic activity on the oxidation of CO and HC but does not significantly catalyze the oxidation of $SO_2$ to $SO_3$.

SUMMARY OF THE INVENTION

It is an object of the present invention to provide an improved method of producing a catalyst for the conversion of CO and HC in exhaust gas of internal combustion engines, which catalyst comprises at least one metal of the platinum group distributed upon a carrier of active alumina and is superior to this type of catalysts produced by conventional methods both in its HC conversion ability and durability but, nevertheless, is less active on the oxidation of $SO_2$ than the conventional catalysts.

According to the invention, a method of producing a catalyst of the described type comprises the steps of (a) preparing an aqueous solution of at least one thermally decomposable compound of a catalytic metal, which is a metal of the platinum group, (b) adding at least one salt of ethylenediaminetetraacetic acid (EDTA) to the aqueous solution to form a complex of the EDTA salt and at least one catalytic metal, (c) then impregnating a carrier, at least the entire surface region thereof being of active alumina, and (d) baking the impregnated carrier in a stream of, at least in majority, steam at temperatures between 300 and 700° C.

Preferably, the steam stream is of substantially 100% steam, and the catalytic metal is platinum and/or palladium, using chloroplatinic acid and palladium chloride as the thermally decomposable compounds of these catalytic metals. The salt of EDTA is preferably selected from diammonium ethylenediaminetetraacetate, disodium ethylenediaminetetraacetate, trisodium ethylenediaminetetraacetate, tetrasodium ethylenediaminetetraacetate, dipotassium ethylenediaminetetraacetate and tripotassium ethylenediaminetetraacetate. These salts may be used either singularly or in combinations. These salts are added to the solution of a catalytic metal compound preferably in such a quantity that the molar ratio of the EDTA salt to the total catalytic metal in the solution is from 0.5:1 to 3:1.

The pH of the aqueous solution is adjusted to 1.0–3.0 subsequently to the addition of the EDTA salt by the addition of a mineral acid, preferably hydrochloric acid, in order to facilitate the formation of the aforementioned complex.

The addition of an EDTA salt to a commonly employed solution of, for example, chloroplatinic acid and/or palladium chloride with the purpose of forming a complex of the EDTA salt and the catalytic metal(s) in the solution prior to the impregnation of a carrier with the solution is a primary feature of the invention. This complex on the carrier undergoes pyrolysis far more readily and completely than the starting compound(s) of the catalytic metal(s), so that there occur an increase in the amount of the catalytic metal(s) present in active state in the catalyst and a decrease in the particle size of the catalytic metal(s). Due to a readily decomposable property of the complex, the baking for the pyrolysis can be accomplished at lower temperatures than in conventional methods. The merit of using an EDTA salt is particularly great when palladium is employed as at least part of the catalytic metal(s). In this case, the use of an EDTA salt results in that the diffusion of the elemental palladium given by the baking of the solution-impregnated carrier does not proceed so deeply into the interior of the carrier as is observed when palladium chloride, for example, is decomposed on the carrier in its original form. This means the presence of an increased amount of palladium on the surface or in a shallow surface region of the carrier, making a contribution to the enhancement of the catalytic activity of the catalyst.

Since complexes of an EDTA salt and metals of the platinum group are water soluble (unlike a complex given by the contact of the same metal with a thiosulfate), the impregnation of a carrier with the solution containing therein a complex of this type can easily and uniformly be accomplished. It is also convenient that EDTA salts are harmless.

It is also an important feature of a method according to the invention that the baking of the solution-impregnated carrier, which is impregnated with the described complex, is performed in a stream of steam, which may be a steam/air mixture containing less than 50% by volume of air but is preferably substantially 100% steam, from the beginning to the end, without followed by any additional heating in a different atmosphere. The employment of steam as the baking atmosphere causes the distribution and the depth of diffusion of the yielded catalytic metal(s) to differ from those in the case of using either air or hydrogen as the baking atmosphere. Improved conversion ability particularly for HC, and durability of catalysts produced by a method of the invention are believed to greatly be attributed to the baking in steam, particularly in 100% steam. Furthermore, a catalyst produced through baking in steam exhibits a considerable lowering in the activity on the oxidation of $SO_2$ compared with an analogous catalyst produced through baking in hydrogen. The reason for these favorable effects of steam is considered that the adsorption of chlorine, which is liberated by the pyrolysis of, for example, palladium chloride, by the alumina carrier is greatly suppressed by the presence of steam since a steam stream readily carries away the liberated chlorine.

DESCRIPTION OF PREFERRED EMBODIMENTS

Figure 1:
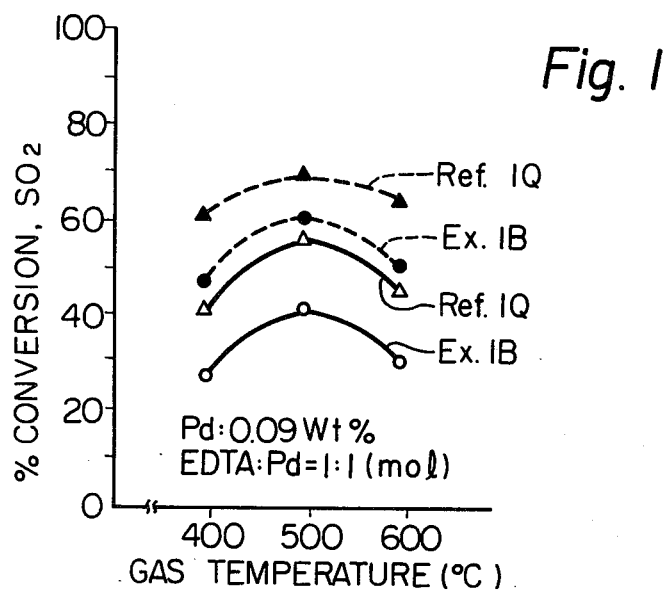
FIGS. 1–3 are graphs showing the catalytic ability on the oxidation of $SO_2$ of a catalyst produced by a method according to the invention for three different catalytic metal compositions.

Various types of conventional supports or carriers can be used without any modification in a method according to the invention. Granules and monolith of a porous or honeycomb structure are two typical examples of practical forms of the carrier. The carrier needs to comprise active alumina, which is also called transient alumina and typified by gamma alumina, either as a sole material or as a coating on a body of an inert ceramics material.

As mentioned hereinbefore, Pt and Pd are particularly preferable catalytic metals in the invention. A smaller amount of Rh or Ir may be used in combination with Pt and/or Pd. Rhodium trichloride and iridium tetrachloride are convenient materials of Rh and Ir.

Considering the conversion ability for HC, durability (as illustrated hereinafter by Examples), and cost of the catalyst, the total amount of the catalytic metal(s) including Pt and/or Pd is preferably made to range from 0.03 to 0.3 Wt% of the catalyst. The proportion of Pt to Pd can optionally be chosen.

The quantity of an EDTA salt added to the solution of the catalytic metal compound(s) is determined preferably such that the molar ratio of the EDTA salt to the total catalytic metal(s) in the solution is from 0.5:1 to 3:1. When this molar ratio is smaller than 0.5:1, a complex of the EDTA salt and the catalytic metal(s) cannot be formed in a sufficient quantity, so that the effect of the addition of the EDTA salt is not appreciable. When the molar ratio is greater than 3:1, there occurs an excessive increase in the concentration of the complex in the solution, resulting in the precipitation of a considerable portion of the complex. The presence of a precipitate in the solution is unfavorable to a uniform impregnation of a carrier with the complex.

The following examples, supplemented by comparative references, illustrate a method according to the invention.

EXAMPLE 1

An aqueous solution of palladium chloride $PdCl_2$ was prepared in four batches so as to each contain 0.63 g of Pd in a volume of 2.8 liters. Diammonium-EDTA (EDTA-$2NH_4$) was added to these four batches of solution in different quantities such that the molar ratio of EDTA-$2NH_4$ to Pd (of $PdCl_2$) in the resultant four kinds of solutions was 0.5:1, 1:1, 2:1 and 3:1, respectively.

Hydrochloric acid was added to these solutions to adjust the pH of every solution to 2.0. Then the temperature of these solutions was raised to 40° C. At this temperature, one liter (680 g) of a granular carrier of gamma alumina was immersed in each of the four kinds of solutions and left therein for 60 min. After withdrawal from each solution, the wet carrier was dried in a hot-air drier at about 150° C. until the water content decreased to about 5%. The dried carrier was heated in a stream of 100% steam at 550° C. for 60 min to decompose the impregnated complex salt. The total quantity of the steam passed over the carrier during the 60 min heating was about 5 liters in terms of the volume of water as the condensate of the entire steam. The thus produced four kinds of catalysts, which will be symbolized as 1A, 1B, 1C and 1D as shown hereinafter in Table 1, individually contained 0.60–0.61 g of Pd (approximately 0.09 Wt%), distributed upon the carrier.

REFERENCE 1

Five kinds of catalysts 1P, 1Q, 1R, 1S and 1T were produced generally in accordance with Example 1, but the production method was modified in the following respects for each of the five kinds of catalysts.

In the production of the catalysts 1P, 1Q and 1R, EDTA-$2NH_4$ was not added to the palladium chloride solution (accordingly the molar ratio (EDTA-2NH$_4$): Pd was zero). The catalyst 1P was obtained by accomplishing the heating for the pyrolysis in a stream of 100% steam (the same condition as in Example 1). The catalyst 1Q was obtained by performing the heating in a stream of hydrogen gas at 550° C. for 180 min, and the catalyst 1R in a stream of air at 550° C. for 80 min. The catalysts 1S and 1T were obtained by varying the quantity of EDTA-2NH$_4$ added to the palladium chloride solution such that the molar ratio (EDTA-2NH$_4$):Pd was 0.1:1 for 1S and 5:1 for 1T and accomplishing the same baking as in Example 1. The catalysts of Reference 1 individually contained 0.60-0.61 g of Pd.

TEST 1

The four kinds of catalysts (1A-1D) produced in Example 1 and the five kinds of catalysts (1P-1T) of Reference 1 were individually tested in the following manner to examine their initial (soon after production) catalytic ability for the conversion of HC and CO in exhaust gas.

Each of these catalysts was packed in a standard reactor (30 mm in inner diameter) for the evaluation of exhaust gas conversion catalysts, and a simulated or synthetic exhaust gas of the following composition was heated and passed through the catalyst bed in the reactor at a volume hourly space velocity of 30,000 hr$^{-1}$.

| Synthetic Exhaust Gas | | |
|---|---|---|
| CO : | 2 | Vol % |
| C$_3$H$_8$ : | 500 | ppm |
| NO : | 1000 | ppm |
| O$_2$ : | 2.5 | Vol % |
| CO$_2$ : | 12 | Vol % |
| H$_2$O : | 10 | Vol % |
| N$_2$ : | balance | |

The thus measured conversion ability of the tested catalysts for HC (propane in this case) and CO is presented in Table 1. The conversion percentage is defined as the percentage of a concentration difference caused by passing the synthetic exhaust gas through the catalyst bed in the reactor to the initial concentration of HC or CO in the exhaust gas (before the contact with the catalyst). The test was repeated at various gas temperatures since the conversion ability of the catalysts of this type depends on temperature. Table 1 shows the data obtained at an exhaust gas temperature of 400° C., which is a relatively low value as a combustion engine exhaust gas temperature: greater conversion percentages were observed at higher exhaust gas temperatures such as 500° C. and 600° C.

TEST 2

This test was an endurance test. Each of the catalysts (1A-1D, and 1P-1T) was disposed in a standard catalytic converter for endurance test, having several circumferentially arranged catalyst chambers. The converter was adjusted such that all the catalyst chambers exhibited the same pressure loss. Two identical sets of converters were attached respectively to both banks of an automotive V-8 4414 ml engine. This engine was subjected to a usual bench test to accomplish an endurance run corresponding to a vehicle travel distance of 20,000 km generally in accordance with the endurance running mode established by Automotive Manufacturers Association of America. A leadless gasoline and a lubricating oil containing very little impurities were used in this test. After the endurance run, the conversion ability of each catalyst was measured in the same manner as in Test 1. The result of this test (conversion percentages) too is presented in Table 1.

Table 1

(Example 1 and Reference 1, Pd in catalysts: 0.09 Wt %)

| | | | \% Conversion | | | |
|---|---|---|---|---|---|---|
| | Mol Ratio | Baking | initially | | after endurance run | |
| Catalyst | EDTA/Pd | Atmosphere | C$_3$H$_8$ | CO | C$_3$H$_8$ | CO |
| Ex. 1A | 0.5/1 | steam | 68.0 | 99.0 | 49.0 | 99.0 |
| Ex. 1B | 1/1 | " | 72.0 | 99.0 | 57.0 | 99.0 |
| Ex. 1C | 2/1 | " | 67.5 | 99.0 | 48.5 | 99.0 |
| Ex. 1D | 3/1 | " | 64.0 | 99.0 | 45.5 | 99.0 |
| Ref. 1P | 0/1 | " | 59.0 | 98.0 | 38.0 | 98.0 |
| Ref. 1Q | 0/1 | hydrogen | 50.5 | 97.5 | 30.0 | 96.5 |
| Ref. 1R | 0/1 | air | 40.0 | 97.0 | 24.5 | 95.0 |
| Ref. 1S | 0.1/1 | steam | 60.0 | 99.0 | 39.0 | 98.0 |
| Ref. 1T | 5/1 | " | 58.5 | 98.0 | 35.5 | 97.0 |

EXAMPLE 2

This example was generally similar to Example 1, but platinum was used as the catalytic metal. The procedures of Example 1 were repeated except that the palladium chloride solution in Example 1 was replaced by an aqueous solution of chloroplatinic acid H$_2$(PtCl$_6$).6H$_2$O, containing 0.63 g of Pt per 2.8 liters. By varying the quantity of EDTA-2NH$_4$ added to this solution as in Example 1, four kinds of catalysts 2A-2D were obtained as shown in Table 2. Each of these catalysts contained 0.60-0.61 g (0.09 Wt%) of Pt.

REFERENCE 2

Reference 2 corresponds to Example 2 in the same manner as Reference 1 corresponds to Example 1, so that Reference 2 gave five kinds of catalysts 2P-2T as shown in Table 2.

The catalysts of Example 2 and Reference 2 were individually subjected to the above described Tests 1 and 2. The test results too are presented in Table 2.

Table 2

(Example 2 and Reference 2; Pt in catalysts: 0.09 Wt %)

| | | | \% Conversion (400° C) | | | |
|---|---|---|---|---|---|---|
| | Mol Ratio | Baking | initially | | after endurance run | |
| Catalyst | EDTA/Pt | Atmosphere | C$_3$H$_8$ | CO | C$_3$H$_8$ | CO |
| Ex. 2A | 0.5/1 | steam | 68.5 | 99.0 | 50.0 | 99.0 |
| Ex. 2B | 1/1 | " | 70.0 | 99.0 | 54.0 | 99.0 |
| Ex. 2C | 2/1 | " | 68.5 | 99.0 | 52.5 | 99.0 |
| Ex. 2D | 3/1 | " | 67.5 | 99.0 | 48.5 | 99.0 |
| Ref. 2P | 0/1 | " | 65.0 | 99.0 | 43.0 | 98.0 |
| Ref. 2Q | 0/1 | hydrogen | 58.5 | 99.0 | 33.5 | 96.0 |
| Ref. 2R | 0/1 | air | 53.0 | 98.0 | 30.0 | 95.5 |
| Ref. 2S | 0.1/1 | steam | 65.0 | 99.0 | 40.5 | 97.0 |
| Ref. 2T | 5/1 | " | 60.5 | 99.0 | 33.5 | 96.0 |

EXAMPLE 3

In this example, an aqueous solution of chloroplatinic acid and palladium chloride, containing 0.63 g of Pt and Pd (in total) per 2.8 liters with a weight ratio Pt/Pd of 1/1, was used in place of the palladium chloride solution in Example 1. In other respects this example was identical with Example 1. Table 3 shows four kinds of catalysts 3A-3D which were produced in this example and contained 0.60-0.61 g of the catalytic metals (Pt+Pd).

REFERENCE 3

Reference 1 was repeated except for the replacement of the palladium chloride solution by the solution of chloroplatinic acid and palladium chloride used in Example 3. This reference gave five kinds of catalysts 3P-3T as shown in Table 3. These catalysts too contained 0.60-0.61 g of Pt and Pd (in total).

The results of the Tests 1 and 2 for the catalysts of Example 3 and Reference 3 are presented in Table 3.

Table 3
(Example 3 and Reference 3; Pt + Pd in catalysts: 0.09 Wt %)

| Catalyst | Mol Ratio EDTA/ (Pt + Pd) | Baking Atmosphere | % Conversion (400° C) | | | |
|---|---|---|---|---|---|---|
| | | | initially | | after endurance run | |
| | | | C$_3$H$_8$ | CO | C$_3$H$_8$ | CO |
| Ex. 3A | 0.5/1 | steam | 70.0 | 99.0 | 48.0 | 99.0 |
| Ex. 3B | 1/1 | " | 75.0 | 99.0 | 50.5 | 99.0 |
| Ex. 3C | 2/1 | " | 72.5 | 99.0 | 47.5 | 99.0 |
| Ex. 3D | 3/1 | " | 70.5 | 99.0 | 46.0 | 99.0 |
| Ref. 3P | 0/1 | " | 68.0 | 99.0 | 43.0 | 99.0 |
| Ref. 3Q | 0/1 | hydrogen | 60.5 | 98.0 | 33.5 | 97.5 |
| Ref. 3R | 0/1 | air | 55.5 | 98.0 | 25.0 | 97.0 |
| Ref. 3S | 0.1/1 | steam | 69.0 | 99.0 | 43.0 | 99.0 |
| Ref. 3T | 5/1 | " | 66.0 | 98.0 | 40.5 | 98.5 |

Remarkably improved characteristics of catalysts produced by a method of the invention can well be seen from the foregoing Examples in comparison with the References.

The following Examples 4-6 are given for showing preferable amounts of the catalytic metals in a catalyst produced by a method of the invention.

EXAMPLE 4

Four differently concentrated aqueous solutions of palladium chloride, respectively containing 0.21 g, 0.63 g, 1.4 g and 2.1 g of Pd per 2.8 liters, were prepared. Then EDTA-2NH$_4$ was added to these solutions in different quantities such that the molar ratio (EDTA-2NH$_4$):Pd was commonly 1:1. Thereafter the procedures of Example 1 were repeated, so as to produce four catalysts 4A-4D, shown in Table 4, respectively containing 0.09, 0.03, 0.2 and 0.3 Wt% Pd.

REFERENCE 4

Two kinds of catalysts were produced generally according to Example 4 except for the use of two differently concentrated palladium chloride solutions, respectively containing 0.07 g and 0.28 g of Pd per 2.8 liters, in place of the four kinds of solutions in Example 4. These catalysts 4V and 4W contained 0.01 and 0.4 Wt% Pd, respectively.

The four kinds of catalysts 4A-4D of Example 4 and the two catalysts 4V, 4W of Reference 4 were individually subjected to Tests 1 and 2. The results are presented in Table 4.

Table 4
(Example 4 and Reference 4; (EDTA-2NH$_4$) : Pd = 1:1 (mol))

| Catalyst | Pd (Wt %) | % Conversion (400° C) | | | |
|---|---|---|---|---|---|
| | | initially | | after endurance run | |
| | | C$_3$H$_8$ | CO | C$_3$H$_8$ | CO |
| 4V | 0.01 | 35.0 | 97.0 | 14.5 | 93.0 |
| 4A | 0.03 | 64.0 | 98.0 | 49.5 | 97.0 |
| 4B | 0.09 | 72.0 | 99.0 | 57.0 | 99.0 |
| 4C | 0.20 | 81.0 | 99.0 | 58.5 | 99.0 |
| 4D | 0.30 | 83.0 | 99.5 | 59.0 | 99.0 |
| 4W | 0.40 | 84.0 | 99.5 | 61.0 | 99.5 |

EXAMPLE 5

Four kinds of Pt-containing catalysts were produced by the same procedures as in Example 4 but using four differently concentrated aqueous solution of chloroplatinic acid, which contained 0.21 g, 0.63 g, 1.4 g and 2.1 g of Pt in 2.8 liters, respectively. These catalysts, 5A-5D, respectively contained 0.03, 0.09, 0.2 and 0.3 Wt% Pt.

REFERENCE 5

This reference was generally similar to Example 5 except that two kinds of differently concentrated aqueous solutions of chloroplatinic acid, respectively containing 0.07 g and 2.8 g of Pt in 2.8 liters, were used. This reference gave two catalysts 4V and 4W which contained 0.01 and 0.4 Wt% Pt, respectively.

The results of Tests 1 and 2 for the catalysts of Example 5 and Reference 5 are shown in Table 5.

Table 5
(Example 5 and Reference 5; (EDTA-2NH$_4$) : Pt = 1:1 (mol))

| Catalyst | Pt (Wt %) | % Conversion (400° C) | | | |
|---|---|---|---|---|---|
| | | initially | | after endurance run | |
| | | C$_3$H$_8$ | CO | C$_3$H$_8$ | CO |
| 5V | 0.01 | 30.5 | 97.0 | 10.5 | 92.0 |
| 5A | 0.03 | 58.5 | 98.0 | 45.0 | 97.0 |
| 5B | 0.09 | 70.0 | 99.0 | 54.0 | 99.0 |
| 5C | 0.20 | 80.5 | 99.0 | 57.0 | 99.0 |
| 5D | 0.30 | 82.0 | 99.0 | 59.0 | 99.0 |
| 5W | 0.40 | 82.0 | 99.5 | 61.5 | 99.0 |

EXAMPLE 6

This example was similar to Example 4 except that the palladium chloride solutions were replaced by four differently concentrated aqueous solutions of chloroplatinic acid and palladium chloride, respectively containing 0.21 g, 0.63 g, 1.4 g and 2.1 g of Pt and Pd (in total) in 2.8 liters with a weight ratio Pt/Pd of 1/1. The total amount of Pt and Pd in four catalysts 6A-6D produced in this example was 0.03, 0.09, 0.2 and 0.3 Wt%, respectively.

REFERENCE 6

Example 6 was repeated except that the total quantity of Pt and Pd in the solutions was changed to 0.07 g and 2.8 g per 2.8 liters (the weight ratio Pt/Pd was 1/1). This reference gave two catalysts 6V and 6W which contained 0.01 and 0.4 Wt% of Pt and Pd (in total), respectively.

Table 6 shows the results of Tests 1 and 2 for the catalysts of Example 6 and Reference 6.

Table 6
(Example 6 and Reference 6; (EDTA-2NH$_4$) : (Pt + Pd) = 1:1 (mol))

| Catalyst | Pt (Wt %) | % Conversion (400° C) | | | |
|---|---|---|---|---|---|
| | | initially | | after endurance run | |
| | | C$_3$H$_8$ | CO | C$_3$H$_8$ | CO |
| 6V | 0.01 | 30.5 | 97.0 | 8.5 | 92.0 |
| 6A | 0.03 | 62.0 | 98.0 | 43.5 | 97.5 |
| 6B | 0.09 | 75.0 | 99.0 | 50.5 | 99.0 |
| 6C | 0.20 | 80.5 | 99.0 | 54.0 | 99.0 |
| 6D | 0.30 | 82.5 | 99.5 | 58.0 | 99.0 |
| 6W | 0.40 | 82.0 | 99.5 | 59.0 | 99.0 |

The experimental data in Tables 4-6 indicate the following matters. When the total amount of the catalytic metal(s) in the catalyst is as small as 0.01 Wt%, the catalysts, even in a fresh state, exhibit very poor conversion ability for HC whether Pt or Pd is used singularly or Pt and Pd are jointly used. The HC conversion ability of the catalysts of Examples 4-6 reaches an acceptable level when the total amount of the catalytic metal(s) is increased to 0.03 Wt%. Taking into consideration the conversion ability after the endurance test too, it is preferable that the total amount of the catalytic metal(s) is not smaller than 0.09 Wt%. The conversion percentages measured on the catalysts of Examples 4–6, including the data obtained after the endurance test, are judged fairly good or excellent and practically acceptable from our experience. Substantially no difference in the conversion ability is observed between the 0.3 Wt% metal catalysts and the 0.4 Wt% metal catalysts when measured in a fresh state. There arises a difference when measured after the endurance test, but the difference is of a negligible magnitude. Considering these matters as well as the cost of the catalyst, the total amount of the catalytic metal(s) in a catalyst produced by a method of the invention is preferably made to be within the range from 0.03 to 0.3 Wt%, most preferably from 0.09 to 0.3 Wt%, of the catalyst.

EXAMPLE 7

This example and the following Reference 7 are presented for showing the influence of the baking atmosphere in the production of catalysts of the described type on the characteristics of the product.

A catalysts 7A containing Pt and Pd as the catalytic metals was produced generally in accordance with the catalyst 3B of Example 3 (and hence the catalyst 6B of Example 6) except that the baking procedure was performed in a stream of a 86/14 mixture (by volume) of steam/air at 550° C. for 60 min. The total quantity of steam passed over the carrier was about 4.3 liters in terms of the volume of water as the condensate of the entire steam. This catalyst 7A contained Pt and Pd (in total) in 0.09 Wt% with a weight ratio Pt/Pd of 1/1.

Another catalyst 7B produced in this example was identical with the catalyst 3B (and 6B) both in the catalytic metals (0.09 Wt% of Pt+Pd) and the production method (baked in 100% steam).

REFERENCE 7

Three kinds of catalysts 7P, 7R and 7U which all contained 0.09 Wt% of Pt and Pd (in total) with a weight ratio Pt/Pd of 1/1 were produced in the following manner.

The catalyst 7P was identical with the catalyst 3P of Reference 3 (produced without using EDTA-2NH$_4$ through baking in 100% steam).

The catalyst 7R was identical with the catalyst 3R of Reference 3 (produced without using EDTA-2NH$_4$ through baking in air).

The catalyst 7 U was produced in the same manner as the catalyst 7A of Example 7 (using EDTA-2NH$_4$ with a molar ratio (EDTA-2NH$_4$):(Pt + Pd) of 1:1) except that the baking was performed in a stream of 50/50 (by volume) steam/air mixture at 550° C. for 60 min.

Table 7 shows the resuls of Tests 1 and 2 for the catalysts of Example 7 and Reference 7.

Table 7
(Example 7 and Reference 7; (Pt + Pd) in catalyst : 0.09 Wt %)

| Catalyst | Mol Ratio (EDTA-2NH$_4$) : (Pt + Pd) | Baking Atmosphere | % Conversion (400° C) initially C$_3$H$_8$ | CO | after endurance run C$_3$H$_8$ | CO |
|---|---|---|---|---|---|---|
| 7B | 1:1 | 100% steam | 75.0 | 99.0 | 50.0 | 99.0 |
| 7A | 1:1 | 86% steam | 70.5 | 99.0 | 48.5 | 99.0 |
| 7U | 1:1 | 50% steam | 62.0 | 98.5 | 40.5 | 98.0 |
| 7P | 0:1 | 100% steam | 68.0 | 99.0 | 43.0 | 99.0 |
| 7R | 0:1 | air | 55.5 | 98.0 | 25.0 | 97.0 |

It can be seen in Table 7 that the use of steam as the baking atmosphere is apparently advantageous over the use of air with regard to the conversion of HC and that the use of 100% steam gives a better product than the use of a steam/air mixture.

TEST 3

This test was performed for examining the catalytic activity of catalysts produced by a method of the invention on the conversion of SO$_2$ into SO$_3$.

Among the catalysts produced in Examples 1–3 and References 1–3, three catalysts 1B, 2B and 3B (of the Examples), which were commonly obtained by the employment of 1:1 as the value for the molar ratio (EDTA-2NH$_4$): (catalytic metal), and three catalysts 1Q, 2Q and 3Q (of the References), which were commonly produced through baking in hydrogen, where chosen as the specimens for this test.

These catalysts were individually packed in the reactor used in Test 1, and a synthetic gas mixture of the following composition was heated and passed through the reactor at a volume hourly spaced velocity of 30,000 hr$^{-1}$. The test was conducted at gas temperatures of 400, 500 and 600° C. and repeated after the catalysts were subjected to the endurance run of Test 2. The results of this test are graphically presented in FIGS. 1–3, in which curves of solid line represent catalysts in a fresh state and curves of broken line catalysts subjected to the endurance test.

| Gas Mixture | |
|---|---|
| SO$_2$ : | 40 ppm |
| CO : | 2 Vol % |
| O$_2$ : | 4 Vol % |
| N$_2$ : | balance |

Figure 2:
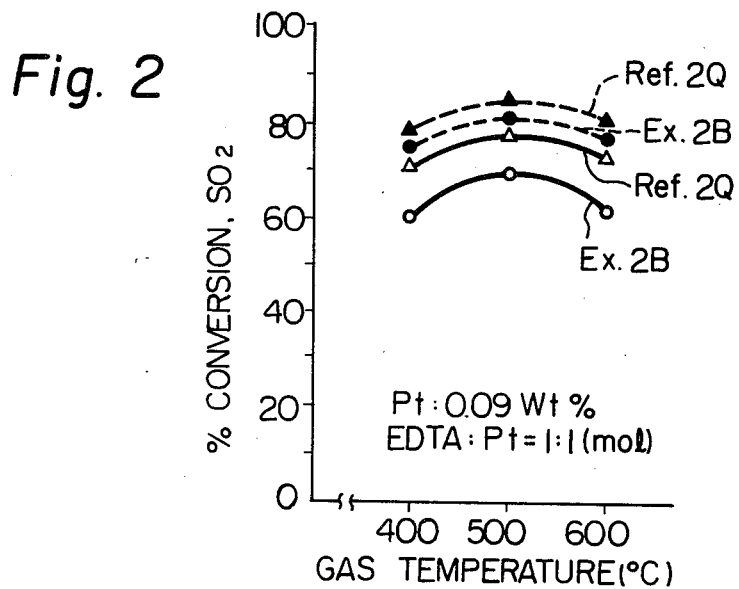
Figure 3:
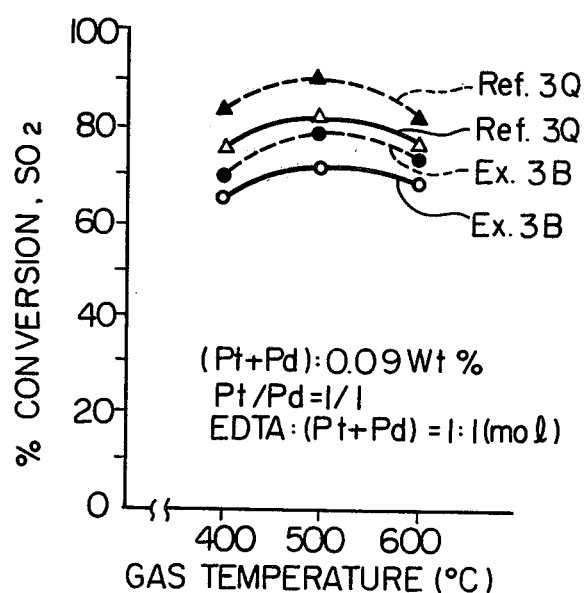

FIGS. 1–3 clearly show the advantage of Pd over Pt with respect to the catalytic activity on the unwanted oxidation of SO$_2$ to SO$_3$ and a considerable lowering of such catalytic activity of catalysts realized by the use of 100% steam as the baking atmosphere in place of hydrogen.

What is claimed is:

1. A method of producing a catalyst for the conversion of carbon monoxide and hydrocarbons in the exhaust gas of internal combustion engines, the method comprising the steps of:
   (a) preparing an aqueous solution of at least one thermally decomposable compound of a catalytic metal of the platinum group;
   (b) adding at least one salt of ethylenediaminetetraacetic acid (EDTA) to said aqueous solution to form a complex of the EDTA salt and at least one catalytic metal, with the molar ratio of the total of said at least one salt of EDTA to the total catalytic metal in said solution being from 0.5:1 to 3:1;

(c) impregnating a carrier, at least the entire surface region of which is of active alumina, with said solution after the step (b);

(d) drying the impregnated carrier air until the water content of the carrier is not greater than about 5 percent; and (e) baking the impregnated carrier in a stream of, at least in majority, steam at temperatures between 300 and 700° C.

2. A method as claimed in claim 1, further comprising the step of adjusting the pH of said solution to 1.0–3.0 by adding a mineral acid to said solution between the steps (b) and (c).

3. A method as claimed in claim 2, wherein said mineral acid is hydrochloric acid.

4. A method as claimed in claim 3, wherein said stream is of substantially 100% steam.

5. A method as claimed in claim 4, wherein said catalytic metal is selected from the group consisting of platinum and palladium.

6. A method as claimed in claim 5, wherein said salt of EDTA is selected from the group consisting of diammonium EDTA, disodium EDTA, trisodium EDTA, tetrasodium EDTA, dipotassium EDTA, and tripotassium EDTA.

7. A method as claimed in claim 6, wherein said thermally decomposable compound is selected from the group consisting of chloroplatinic acid and palladium chloride.

* * * * *